US006247307B1

(12) United States Patent
Hung

(10) Patent No.: US 6,247,307 B1
(45) Date of Patent: Jun. 19, 2001

(54) HYDRAULIC RAISING APPARATUS WITH AUTOMATIC REGULATED SPEEDS

(75) Inventor: Michael Hung, Lu Chu Hsiang (TW)

(73) Assignee: MVP (H. K.) Industries Limited, North Point (HK)

( * ) Notice: Subject to any disclaimer, the term of this patent is extended or adjusted under 35 U.S.C. 154(b) by 0 days.

(21) Appl. No.: 09/394,917

(22) Filed: Sep. 13, 1999

(51) Int. Cl.[7] ..................................................... F16D 31/02

(52) U.S. Cl. ............................................................... 60/479

(58) Field of Search ....................................... 60/477, 479

(56) References Cited

U.S. PATENT DOCUMENTS 5,755,099 * 5/1998 Hung ...................................... 60/479
5,937,647 * 8/1999 Hung ...................................... 60/479
5,992,149 * 11/1999 Hu .......................................... 60/479

FOREIGN PATENT DOCUMENTS

1352133 * 5/1974 (GB) ...................................... 60/477

* cited by examiner

*Primary Examiner*—John E. Ryznic
(74) *Attorney, Agent, or Firm*—Bacon & Thomas, PLLC

(57) ABSTRACT

A hydraulic raising apparatus with automatic regulated speeds can automatically adapt its raising speeds for various load conditions. It mainly comprises additional hydraulic circuits, check valves and adjustable relief valves arranged between the piston rod side chamber and the rodless side chamber of hydraulic cylinders and pumps. The arrangement enables hydraulic cylinders and pumps to change their working modes in a hydraulic circuit, depending on loaded conditions, from a piston type to a spool type and vice versa. Hence the hydraulic apparatus can adjust its raising speeds in agreement with loads. When the apparatus bears a light load, it will quickly carry the load to position. On the other hand, when the load is heavy the apparatus will move it at a slower speed and thus need just reduced input energy. Therefore, the apparatus according to the invention can enhance efficiency to the greatest extent.

6 Claims, 4 Drawing Sheets

HYDRAULIC RAISING APPARATUS WITH AUTOMATIC REGULATED SPEEDS

BACKGROUND OF THE INVENTION (a) Field of the Invention

A hydraulic raising apparatus with automatic regulated speeds comprises additional hydraulic circuits, check valves and adjustable relief valves arranged between the piston rod side chamber and the rodless side chamber of hydraulic cylinders and pumps. The arrangement enables hydraulic cylinders and pumps to change their role in circuit, depending on loaded conditions, from a piston to a spool and vice versa. Hence the hydraulic apparatus can adjust its raising speeds in agreement with loads. When a load is light the apparatus can quickly carry it to position. On the other hand, when the load is heavy the apparatus will gradually move it with reduced input energy.

(b) Description of the Prior Art

A conventional hydraulic raising apparatus, the so-called jack, primarily comprises a working cylinder, a piston rod, a hydraulic pump, a reservoir, a return valve (or release valve), a safety valve and connection circuits. The piston rod is provided on the outer end with a raising arm. In operation a rocker or handle is usually pulled and pushed to pump hydraulic fluid into the working cylinder and drive the piston rod to raise a load.

In such a conventional structure, it does not have variable speeds for different loading conditions. The same speed occurs either at no load or in a light or a heavy load condition. Consequently users must operate the handle repeatedly to activate the working cylinder until the load is moved by the raising arm to a desired position. The raising speed does not vary in agreement with the apparatus's load condition. It not only wastes time and but also leads to a low working efficiency. Users must spend more energy to operate. Evidently an invariable speed can not satisfy users' need. It is desirable to have improvements made on conventional structures.

SUMMARY OF THE INVENTION

The primary object of the invention is to provide a hydraulic raising apparatus that can automatically adjust it own raising speeds and that comprises an additional hydraulic circuit and a check valve arranged between the piston rod side chamber and the rodless chamber of the working cylinder, and hydraulic circuits and check valves or relief valves disposed between the rodless side chamber of the working cylinder and an oil reservoir, and corresponding adjustable relief valves and check valves located between the piston rod side chamber and the rodless side chamber of the hydraulic pump. The hydraulic raising apparatus further comprises an inlet circuit, a return circuit, and a safety circuit between the working cylinder and the hydraulic pump. With this arrangement, the working cylinder and the hydraulic pump can change the driving mode they act on hydraulic fluid from a spool to a piston rod or vice versa depending on load conditions. The apparatus automatically adjusts its own raising speeds for varying load conditions to quickly raise a light load but to provide a slow speed for raising a heavy load and minimizing the required energy that users have to exert on the handle. The apparatus according to the invention can enhance the working efficiency to the greatest extent and reach a significant effect of saving time and labor.

Another object of the invention is to provide a raising apparatus with automatic adjustable raising speeds in which the working cylinder and/or the hydraulic pump has also a multiple stage design. The interiors of cylinders and pumps are divided into many working chambers. Each chamber communicates with another through hydraulic circuits, checking valves and relief valves. Thus the raising apparatus can provide more various speeds for different lifting requirements.

DETAILED DESCRIPTION OF THE PREFERRED EMBODIMENTS

Figure 1:
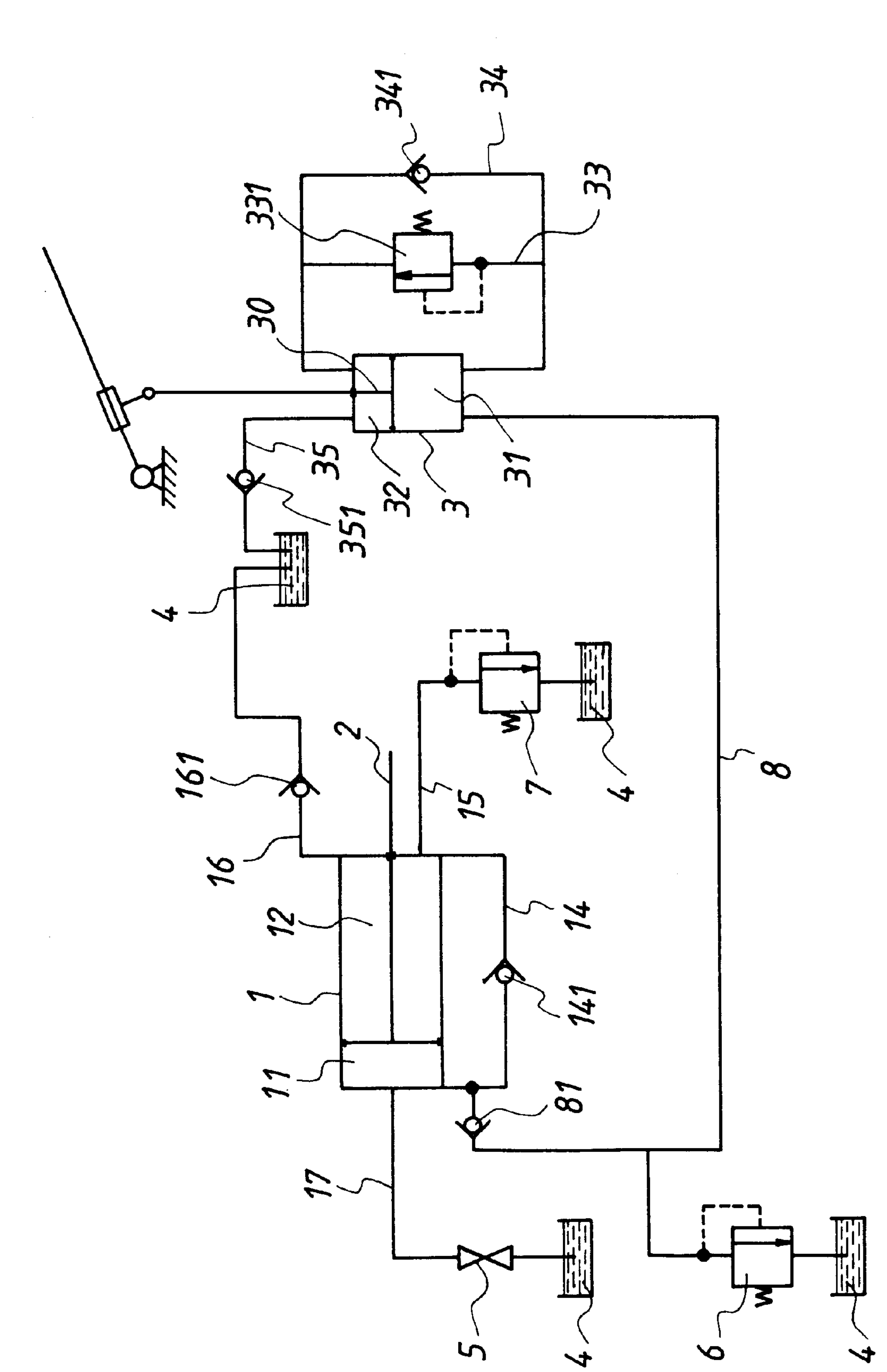
FIG. 1 is a circuit drawing schematically indicating the constituents of a raising apparatus according to the invention.

As shown in FIG. 1, the hydraulic raising apparatus with automatically adjustable speeds according to the invention comprises a hydraulic cylinder 1, a piston rod 2, a hydraulic pump 3, a reservoir 4, a return valve 5 and a safety valve.

The hydraulic cylinder 1 is provided with a piston rod 2 and its interior is divided into two parts, a rodless side chamber 11 and a piston rod side chamber 12. A hydraulic circuit 14 connects the rodless side chamber 11 with the piston rod side chamber 12. The hydraulic circuit 14 consists of a check valve 141 that restricts hydraulic liquid flow in a single direction from the piston rod side chamber 12 to the rodless side chamber 11. Further, the piston rod side chamber 12 communicates with the reservoir 4 via another hydraulic circuit 15 and a relief valve 7. Besides, the piston rod side chamber 12 is also provided with a supply circuit 16 and a check valve 161 through which the hydraulic liquid in the reservoir 4 can flow into the piston rod side chamber 12 in a single direction for replenishment. The rodless chamber 11 is connected to the reservoir 4 via a return circuit 17 and a return valve 5.

The interior of the hydraulic pump 3 is provided with a piston rod 30 and divided into a rodless chamber 31 and a piston rod side chamber 32. Two oil channels 33 and 34 connect the piston rod side chamber 32 with the rodless side chamber 31 through an adjustable relief valve 331 and a check valve 341 respectively. The adjustable relief valve 331 and the oil channel 33 restrict hydraulic liquid flow in a single direction from the rodless side chamber 31 to the piston rod side chamber 32. When hydraulic liquid flows from the piston rod side chamber 32 to the rodless side chamber 31, it must pass through the oil channel 34 and the check valve 341 in a unidirectional return flow. The pump 3 is connected to the reservoir 4 via a supply circuit 35 and a check valve 351, which restrict hydraulic liquid flows in a single direction from the reservoir 4 to the piston rod side chamber 32 of the pump 3. When the piston rod 30 of the pump 3 is raised, hydraulic fluid passes through the oil channel 34 and the check valve 341 and gets into the rodless side chamber 31.

The aforesaid working cylinder 1 is connected to the pump 3 through an inlet circuit 8 and a check valve 81. The inlet circuit 8 is also equipped with a safety valve 6.

With the above arrangement, the adjustable relief valve 331 connected to the pump 3 is closed when the raising apparatus is at no load. At this moment the hydraulic pump 3 drives hydraulic liquid to flow by the piston rod. When the pump is activated, the piston rod 30 moves down and hydraulic liquid flows from the rodless side chamber 31 of the pump 3 into the rodless side chamber 11 of the working cylinder 1 through the inlet circuit 8 and the check valve 81. On the other hand hydraulic liquid flows into the piston rod side chamber 32 from the reservoir 4 through the supply circuit 35 and the check valve 351 to replenish the pump 3 due to the motion of the piston rod 30. Thus it functions as a piston pump. In other words, the hydraulic liquid flowing out of the rodless side chamber 31 of the pump 3 will directly enter the rodless side chamber 11 of the working hydraulic cylinder 1 via the inlet circuit 8 to move the piston rod 2 upwards when the pump 3 is operated at no load conditions. At the same time the excessive hydraulic liquid in the piston rod side chamber 12 of the cylinder 1 flows into the rodless side chamber 11 through the check valve 141. Thus one downward movement of the piston rod 30 of the pump 3 will synchronously urge the hydraulic liquid in both the rodless side chamber 31 and the piston rod side chamber 12 to flow into the rodless side chamber 11. The invention makes use of such differential motion to hasten raising the piston rod 2 of the working cylinder 1. At this moment the piston rod 2 of the working cylinder 1 is driven as a spool and hydraulic liquid can open only the check valve 141 not the relief valve 7.

When the raising apparatus is under a light load, the pump 3 operates in the same way as the described above. However, the relief valve 7 of the hydraulic circuit 15 connected to the hydraulic cylinder 1 is open and the check valve 141 is closed due to the hydraulic pressure of the piston rod side chamber 12 being overwhelmed by the boosted pressure inside the rodless side chamber 11. As a result the hydraulic liquid in the working cylinder 1 is driven by the piston rod 2 of the cylinder 1. Only the hydraulic liquid coming from the rodless side chamber 31 of the pump 3 can enter the rodless side chamber 11 of the working cylinder 1 when the pump 3 is operated. The hydraulic liquid leaving the piston rod side chamber 12 directly flows into the reservoir 4 via the circuit 15. Hence the raising apparatus will not be accelerated by any differential motion. The piston rod 2 of the cylinder 1 will move at a speed slower than the one it moves at when no load.

When a load taken by the cylinder 1 reaches a limit, the apparatus will operate in a heavy load condition. In this case the working cylinder 1 still functions as if it is a piston in the circuit. The adjustable relief valve 331 of the oil channel 33 of the pump 3 is opened and thus the pump 3 functions like a spool. When the pump 3 is operated, the hydraulic liquid in the rodless side chamber 31 passes through the adjustable relief valve and then enters the piston rod side chamber 32. Thus a part of hydraulic fluid leaving the rodless side chamber 31 of the pump 3 returns to the piston rod side chamber 12. Only reduced quantity of hydraulic fluid enters the rodless side chamber 11 of the working cylinder 1. As a consequence, the cylinder raises a load at a speed slower than the previous two speeds. Returned hydraulic liquid also provides an effect of saving energy that users have to exert on the pump.

When a job has been done and users want to release the piston rod of the working cylinder from an elevated position, the return valve 5 is opened to discharge the hydraulic liquid of the rodless side chamber 11 of the cylinder 1 into the reservoir 4. In the meantime hydraulic liquid flows into the piston rod side chamber 12 through the supply circuit 16 and the check valve 161 for replenishment. In this way the piston rod 2 returns to its original position and the cylinder 1 gets sufficient hydraulic fluid for the next differential movement operation.

The foregoing adjustable relief valve 331 of the oil channel 33 of the pump 3 has a rated hydraulic pressure. If the pressure of hydraulic fluid is lower than that rated pressure, the relief valve 331 will be closed. On the other hand, the valve 33 will be opened when the pressure of hydraulic fluid is higher than the rated value. As to the relief valve 7 and the safety valve 6 of the hydraulic circuit 15 connected to the piston rod side chamber 12 of the cylinder 1, they work like average relief valves.

Figure 2:
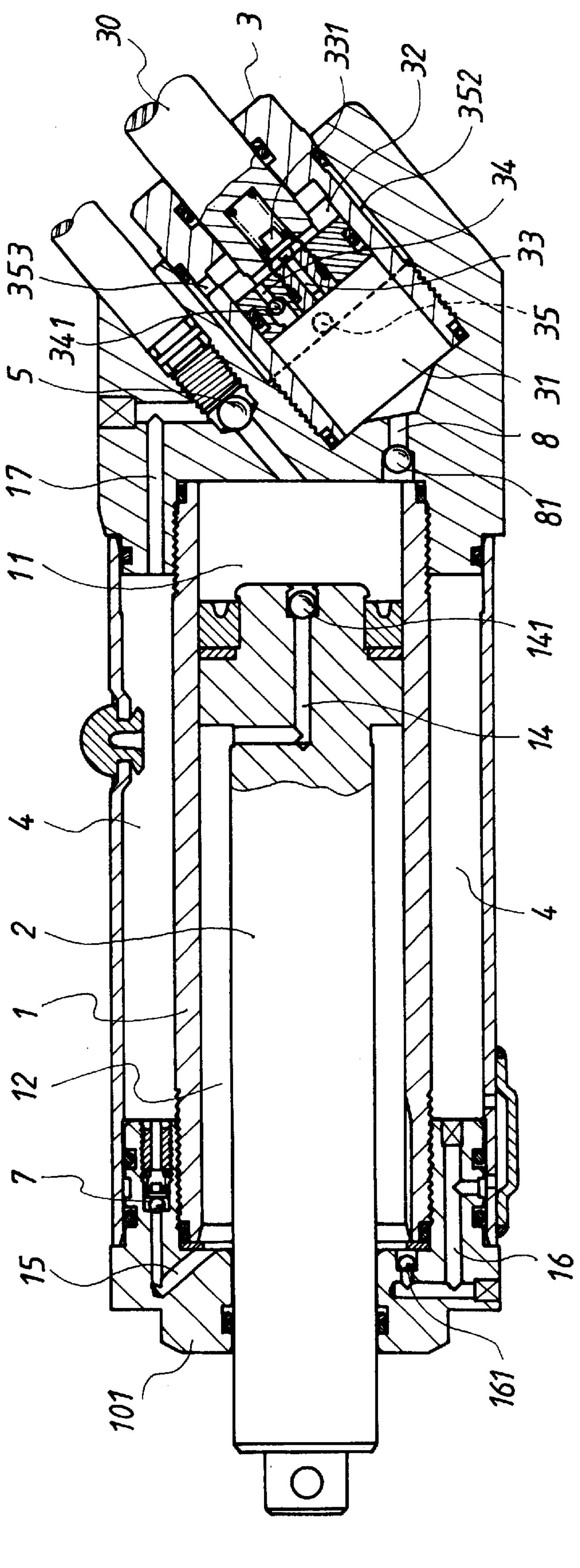
FIG. 2 is a cross sectional view showing the internal structure of the raising apparatus of FIG. 1 in an assembled state.
Figure 3:
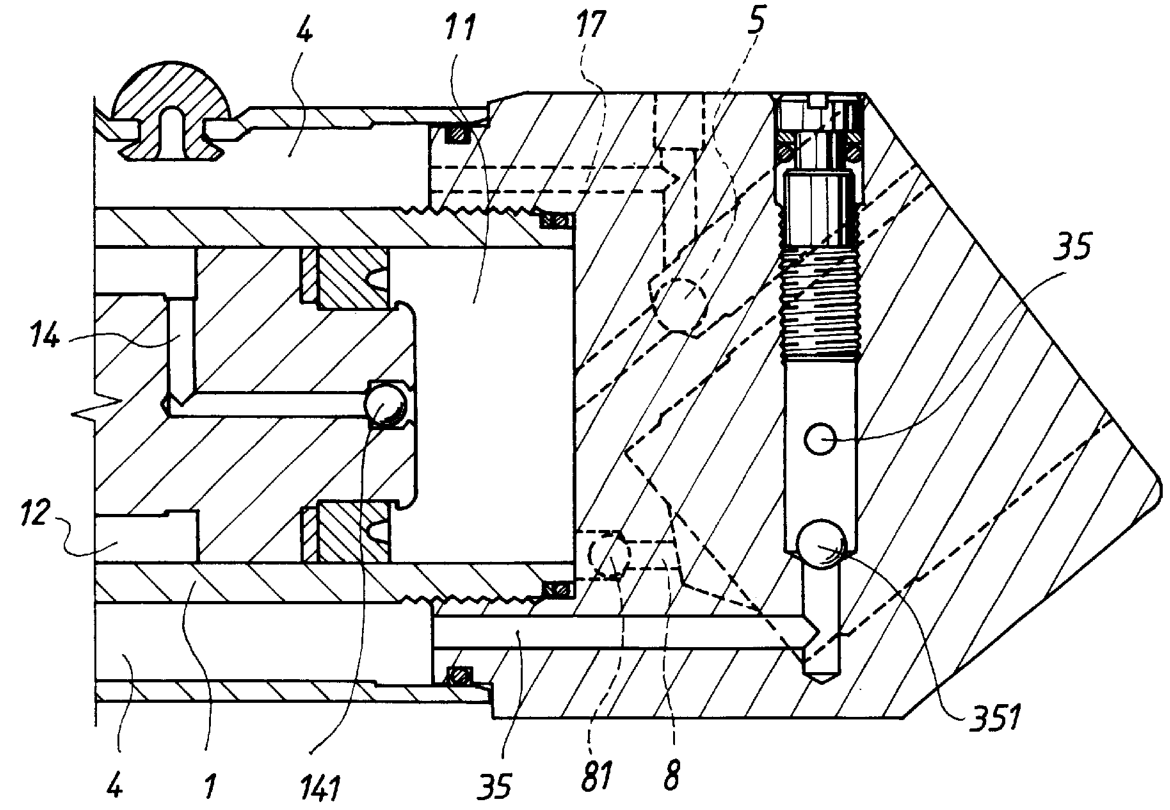
FIG. 3 is another cross sectional view partially showing the interior of the raising apparatus of FIG. 1.

FIGS. 2 and 3 illustrate the embodied structure of the raising apparatus according to the invention. To make the construction simpler and feasible for the aforementioned supply circuit 35 of the pump 3, provided on the inner wall of the piston rod side chamber 32 are an annular groove 352 and a side channel 353 communicated with same. The annular groove 352 and the side channel 353 constitute a part of the supply circuit 35. The hydraulic fluid of the reservoir 4 can pass through the check valve 351, the supply circuit 35, the annular groove 352 and the side channel 353 and finally flow into the piston rod side chamber 31 of the pump 3 in a single direction.

Also can be seen from FIGS. 2 and 3, the aforesaid hydraulic circuit 14 between the rodless side chamber 11 of the cylinder 1 and the piston rod side chamber 12 is formed on the rear end of the piston rod 2 to allow communication between the rodless side chamber 11 and the piston rod side chamber 12. However, a check valve 141 is added to restrict hydraulic fluid flow in a single direction from the piston rod side chamber 12 to the rodless side chamber 11 only.

Further, both the hydraulic circuit 15 and the supply circuit 16 connected to the piston rod side chamber 12 of the cylinder 1 are located in the front block 101 of the cylinder 1. These two circuits 15 and 16 are provided with a relief valve 7 and a check valve 161 respectively.

The above embodiments are illustrative examples of two-staged cylinders or pumps. They can produce three different raising speeds for different load conditions. With the same principles, the raising apparatus can be of multiple stages by dividing the internal chambers of pumps and cylinders into more cells as long as these cells are respectively provided with adjustable relief valves and check valves. The combination of multiple-staged pumps and cylinders can produce various raising speeds for different load conditions and more effectively reach the effects of raising a light load promptly and providing slow speeds for raising a heavy load with reduced input energy. It is to be realized that various modifications and substitutions can be made without deviation from the principles and spirit of the invention and they are intended to be encompassed by the present invention.

Figure 4:
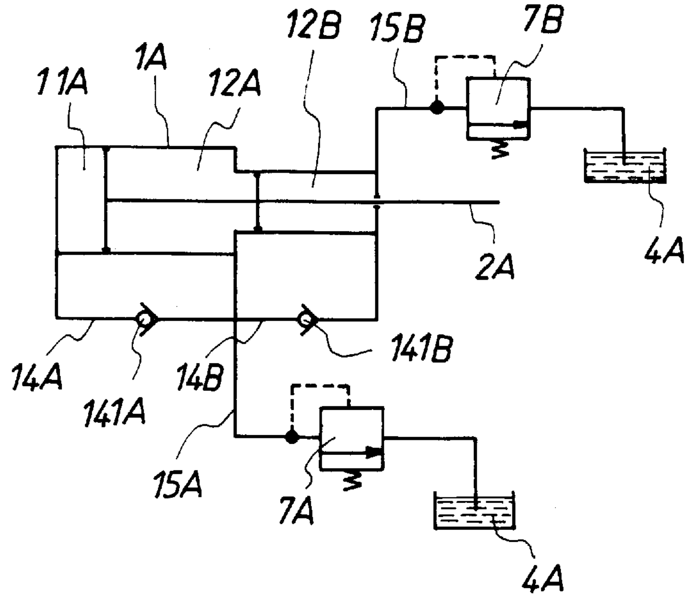
FIG. 4 illustrates an example of a working cylinder used in a three-stage raising apparatus.

FIG. 4 indicates an embodiment of the raising apparatus with three-staged hydraulic cylinders 1A and piston rods 2A according to the invention. The rodless side chamber 11A, the first piston rod side chamber 12A and the second piston rod side chamber 12B are connected by hydraulic circuits 14A and 14B. The hydraulic circuits 14A and 14B are respectively provided with a check valve 141A and 141B, which restrict hydraulic fluid flows in a single direction from the first piston rod side chamber 12A to the rodless side chamber 11A or from the second piston rod side chamber 12B to the first piston rod side chamber 12A only. The first piston rod side chamber 12A and the second rod side chamber 12B are connected to a reservoir 4A via another hydraulic circuit 15A and 15B and a relief valve 7A and 7B respectively. Similarly the first piston rod side chamber 12A and the second piston rod side chamber 12B are provided with a supply circuit and a check valve (not shown in the drawings) that allow hydraulic fluid to flow from the reservoir 4A into the first piston rod side chamber 12A or into the second piston rod side chamber 12B in a single direction for oil replenishment. Also the rodless side chamber 11A is connected with the reservoir 4A via a return circuit and a return valve. Evidently more divided chambers of a hydraulic cylinder can produce more raising speed variations.

Figure 5:
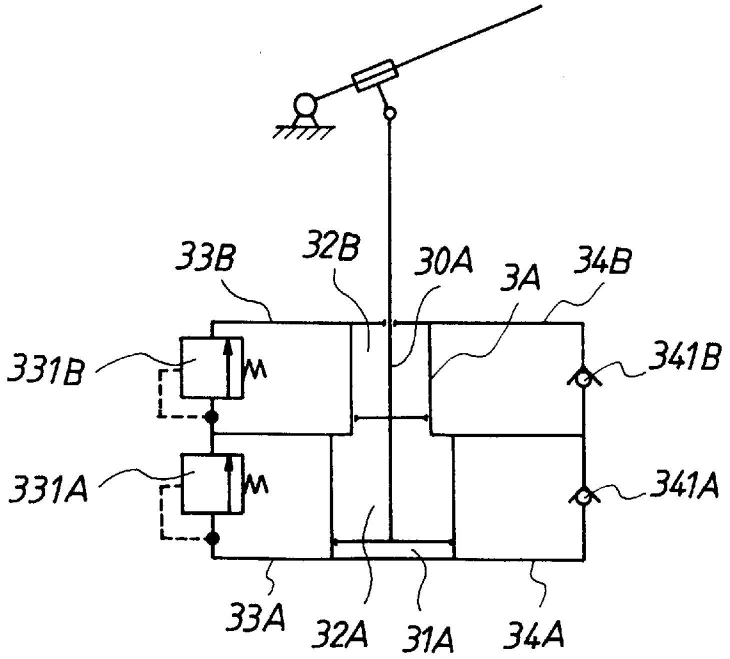
FIG. 5 illustrates an example of a hydraulic pump used in a three-stage raising apparatus.

FIG. 5 shows an embodiment of a raising apparatus using three-staged hydraulic pumps 3A and corresponding three-staged piston rods 30A according to the present invention. The interior of the pump is divided into a rodless side chamber 31A, a first piston rod side chamber 32A and a second piston rod side chamber 32B. Between the first piston rod side chamber 32A and the rodless side chamber 31A, and between the first piston rod side chamber 32A and the second piston rod side chamber 32B are respectively provided with two oil channels 33A and 34A, and 33B and 34B. The two oil channels 33A and 34A, 33B and 34B are individually furnished with an adjustable relief valve 331A, 331B and a check valve 341A, 341B. The adjustable relief valves 331A and 331B and the oil channels 33A and 34A restrict hydraulic fluid flow in a single direction from the rodless side chamber 31A to the first piston rod side chamber 32A or from the second piston rod side chamber 32B to the first piston rod side chamber 32A. Similarly the hydraulic fluid flows from the first piston rod side chamber 32A to the rodless side chamber 31A must pass through the oil channel 34A and the check valve 341A in a single direction and the flows from the second piston rod side chamber 32B to the first piston rod side chamber 32A must go through the oil channel 34B and the check valve 341B in a single direction. With the same reason, a hydraulic pump with four stages or five stages or more stages can be obtained by dividing the interior of the pump into chambers of corresponding number. Such apparatuses can produce more speed variations.

Not to mention, the structures of a raising apparatus with automatic regulated speeds described above are also applicable to hydraulic jacks of various forms, such as upright types, horizontal types, hand jacks or motor-driven types.

From the above description, evidently the raising apparatus according to the invention can automatically adapt its raising speeds for various loads to achieve the objects set forth in the beginning of the text. It has significant advantages over prior art and its structural arrangement has never been found in conventional hydraulic jacks. Thus the present invention meets the requirements of granting a patent.

What is claimed is:

1. A hydraulic raising apparatus with automatic regulated speeds comprising:

a working hydraulic cylinder 1 that is provided therein with a piston rod 2 and of which the interior is divided into a rodless side chamber 11 and a piston rod side chamber 12; said rodless side chamber 11 being connected to said piston rod side chamber 12 via a hydraulic circuit 14 with a check valve 141 that restricts hydraulic liquid flow in a single direction from said piston rod side chamber 12 to said rodless side chamber 11; said piston rod side chamber 12 being connected to a reservoir 4 through another hydraulic circuit 15 and a relief valve 7; said piston rod side chamber 12 being provided with a supply circuit 16 and a check valve 161 through which the hydraulic liquid of said reservoir 4 can flow into the piston rod side chamber 12 for replenishment; said rodless side chamber 11 being connected to the reservoir 4 through a return circuit 17 and a return valve 5; and a hydraulic pump 3 that is provided therein a piston rod 30 and of which the interior is divided into a rodless side chamber 31 and a piston rod side chamber 32; two oil channels 33 and 34 connecting said piston rod side chamber 32 with said rodless side chamber 31 through an adjustable relief valve 331 and a check valve 341 respectively so that the hydraulic fluid flow from said rodless side chamber 31 to said piston rod side chamber 32 must pass through said adjustable relief valve 331 and said oil channel 33 and the hydraulic fluid flow from said piston rod side chamber 32 to said rodless side chamber 31 must pass through said oil channel 34 and said check valve 341 in a single direction; said hydraulic pump 3 being connected to said reservoir 4 through a hydraulic circuit 35 and a check valve 351 which restricts hydraulic fluid flow in a single direction from the reservoir 4 to the pump 3; said working hydraulic cylinder 1 being connected to said pump 3 via an inlet circuit 8 with a safety valve 6;

and characterized in that said working hydraulic cylinder can alter its working modes in said hydraulic circuits from a piston type to a spool type and vice versa to automatically adjust its raising speeds for various load conditions through said hydraulic circuit 14 and said check valve 141 interposed between said said rodless side chamber 11 and said piston rod side chamber 12, and through the supply circuit 16, the check valve 161, the hydraulic circuit 15 and the relief valve 7 disposed between the piston rod side chamber 32 in conjunction with said two oil channels 33 and 34 implanted between said piston rod side chamber 32 of said pump 3 and said rodless side chamber 31.

2. The hydraulic raising apparatus with automatic regulated speeds as claimed in claim 1 wherein the inlet circuit 35 of said pump 3 is composed of an annular groove 352 formed on the inner wall of the piston rod side chamber 32 of the pump 3 and a side channel 353 connected to the annular groove 32.

3. The hydraulic raising apparatus with automatic regulated speeds as claimed in claim 1 wherein said hydraulic circuit 14 between the rodless side chamber 11 of the cylinder 1 and the piston rod side chamber 12 is formed on the rear end of the piston rod 2 to connect the rodless side chamber 11 with the piston rod side chamber 12 and is provided with a check valve 14 that restricts hydraulic fluid flow in a single direction from the piston rod side chamber 12 to the rodless side chamber 11.

4. The hydraulic raising apparatus with automatic regulated speeds as claimed in claim 1 wherein the hydraulic circuit 15 and the supply circuit 16 connected to the piston rod side chamber 12 of the cylinder 1 are constricted on the front block 101 of the cylinder 1 and are individually provided with a relief valve 7 and a check valve 161.

5. The hydraulic raising apparatus with automatic regulated speeds as claimed in claim 1 wherein said hydraulic cylinder can be multiple-staged by using a corresponding multiple-staged piston rod and a rodless side chamber 11A and a plurality of piston rod side chambers 12A, 12B; each chamber 11A, 12A, 12B being connected to another chamber via a hydraulic circuit 14A, 14B that includes a check valve 141A, 141B and connected to a reservoir 4A via another hydraulic circuit 15A, 15B and another check valve

7A, 7B; each piston rod side chamber 12A, 12B being connected to a supply circuit and a check valve for acquiring oil replenishment from a reservoir 4A and said rodless side chamber 11A also being connected to the reservoir 4A via a return circuit and a return valve.

6. The hydraulic raising apparatus with automatic regulated speeds as claimed in claim 1 wherein said hydraulic pump can be multiple-staged by using a corresponding multiple-staged piston rod and a rodless side chamber 31A and a plurality of piston rod side chambers 32A, 32B; between said rodless side chamber 31A and the first piston rod side chamber 32A, the first piston rod side chamber 32A and the second piston rod side chamber 32B and each pair of other adjacent piston rod side chambers being respectively provided with two hydraulic circuits 33A and 34A, 33B and 34B, each of which includes an adjustable relief valves 331A, 331B and a check valve 341A, 341B that restrict hydraulic fluid flow from the rodless side chamber 31A to the first piston rod side chamber 32A, or from the second piston rod side chamber 32B to the first piston rod side chamber 32A, and other hydraulic fluid flows between two adjacent piston rod side chambers in a single direction.

* * * * *